United States Patent [19]

Ikegami

[11] Patent Number: 5,617,443
[45] Date of Patent: Apr. 1, 1997

[54] METHOD AND APPARATUS FOR GENERATING GAMMA-RAY LASER

[75] Inventor: Hidetsugu Ikegami, Takarazuka, Japan

[73] Assignee: Research Development Corporation of Japan, Japan

[21] Appl. No.: 548,684

[22] Filed: Oct. 26, 1995

[30] Foreign Application Priority Data

Nov. 29, 1994 [JP] Japan .................................. 6-293607

[51] Int. Cl.⁶ ....................................................... H01S 3/09
[52] U.S. Cl. ................... 372/74; 372/5; 372/73
[58] Field of Search ....................................... 372/73, 74, 5

[56] References Cited

U.S. PATENT DOCUMENTS 4,933,950  6/1990  Ikegami ..................................... 372/73

OTHER PUBLICATIONS

Physical Review Letters, vol. 60, No. 10, 7 Mar. 88 "Free Positronium Radiations".

*Primary Examiner*—James W. Davie
*Attorney, Agent, or Firm*—Lorusso & Loud

[57] ABSTRACT

An electron beam and a positron beam accelerated to the same energy are caused to join into a confluence in the same direction by a magnet for joining electrons and positrons, and positronium molecules or beam-shaped para-positroniums of the same phase cooled to transient Bose-Einstein condensation or the vicinity thereof are formed on the axis of confluence by a beam focusing solenoidal coil, thereby simultaneously generating gamma-ray lasers of two wavelengths which accompany annihilation caused by self-stimulated radiation, namely a forward GASER, which is a monochromatic gamma-ray laser having a photon energy of greater than several MeV and a backward GASER, which is a monochromatic gamma-ray laser having a photon energy of less than 200 keV.

6 Claims, 1 Drawing Sheet

METHOD AND APPARATUS FOR GENERATING GAMMA-RAY LASER

BACKGROUND OF THE INVENTION

This invention relates to a method and apparatus for generating a gamma-ray laser. More particularly, the invention relates to a method and apparatus for simultaneously generating a forward gamma-ray laser [F-GASER (Gamma-ray Amplification by Stimulated Emission of Radiation)], in which the photon energy is greater than 1 MeV (MeV: 1,000,000 electron volts), and a backward gamma-ray laser (B-GASER) in the vicinity of a laser light region of less than 200 keV (eV: electron volt).

Conventional techniques for generating a coherent monochromatic light beam are limited to the visible light region, as in the case of a laser, and to the region neighboring it. It has not been possible to realize a method of generating both X-rays and coherent monochromatic light of sufficiently practical intensity, namely coherent monochromatic gamma rays, of a much higher energy, i.e., a photon energy of greater than 1 MeV.

SUMMARY OF THE INVENTION

Accordingly, an object of the present invention is to provide a method and apparatus for generating a gamma-ray laser, in which a high-energy light beam superior to that of synchrotron radiation (SR) in terms of its monochromatic property and low degree of noise is generated based upon a principle that is entirely different from that of the technique used to generate coherent monochromatic light in the prior art.

According to the present invention, the foregoing object is attained by providing:

(1) A method of generating a gamma-ray laser comprising the steps of causing an electron beam and a positron beam accelerated to identical energies to join into a confluence in the same direction, and forming, on the axis of confluence, positronium molecules or beam-shaped para-positroniums of the same phase cooled to transient Bose-Einstein condensation or the vicinity thereof, thereby simultaneously generating gamma-ray lasers of two wavelengths which accompany annihilation caused by self-stimulated radiation.

(2) In the method of generating a gamma-ray laser described in (1) above, the positron beam is stored to at least a predetermined energy and intensity.

(3) In the method of generating a gamma-ray laser described in (1) above, a polarized or non-polarized laser photon beam is projected upon the confluent electron and positron beams to selectively stimulate formation of positronium molecules or beam-shaped cooled para-positroniums of the same phase, thereby generating a gamma-ray laser.

(4) In the method of generating a gamma-ray laser described in (3) above, the polarized or non-polarized laser photon beam is projected anti-parallel to the traveling direction of the confluent electron and positron beams.

(5) An apparatus for generating a gamma-ray laser comprises an electron and positron injector system, a positron circulation ring, a focusing element of an electron-positron confluence section, and means for accelerating an electron beam and a positron beam to respective predetermined energies by the injector system and, if necessary, the circulation ring, and causing the electron beam and the positron beam to join into a confluence in the same direction by the focusing element of the confluence section, thereby generating a high-energy forward gamma-ray laser (F-GASER) and a low-energy backward gamma-ray laser (B-GASER) in a forward direction and reverse direction, respectively.

(6) In the apparatus for generating a gamma-ray laser described in (5) above, there is further provided a device for projecting laser light or maser light in a direction anti-parallel to the merged electron and positron beams in order to selectively stimulate formation of positronium molecules or beam-shaped cooled para-positroniums of the same phase.

In accordance with the present invention, an electron beam and a positron beam are accelerated to prescribed energies, the beam are stored if necessary, and the beams are joined into a confluence in the same direction. Under irradiation with stimulating laser light or maser light, positronium molecules or cooled or condensed para-positroniums are formed in the shape of a beam in the same phase. A high-energy F-GASER (forward GASER: forward gamma-ray laser) corresponding to substantially all of the energy of the electrons and positrons and a B-GASER (backward GASER: backward gamma-ray laser) of the remaining energy can be generated on the confluent beam axis by stimulated annihilation of positronium molecules or cooled para-positroniums.

Other features and advantages of the present invention will be apparent from the following description taken in conjunction with the accompanying drawings.

DESCRIPTION OF THE PREFERRED EMBODIMENT

Figure 1:
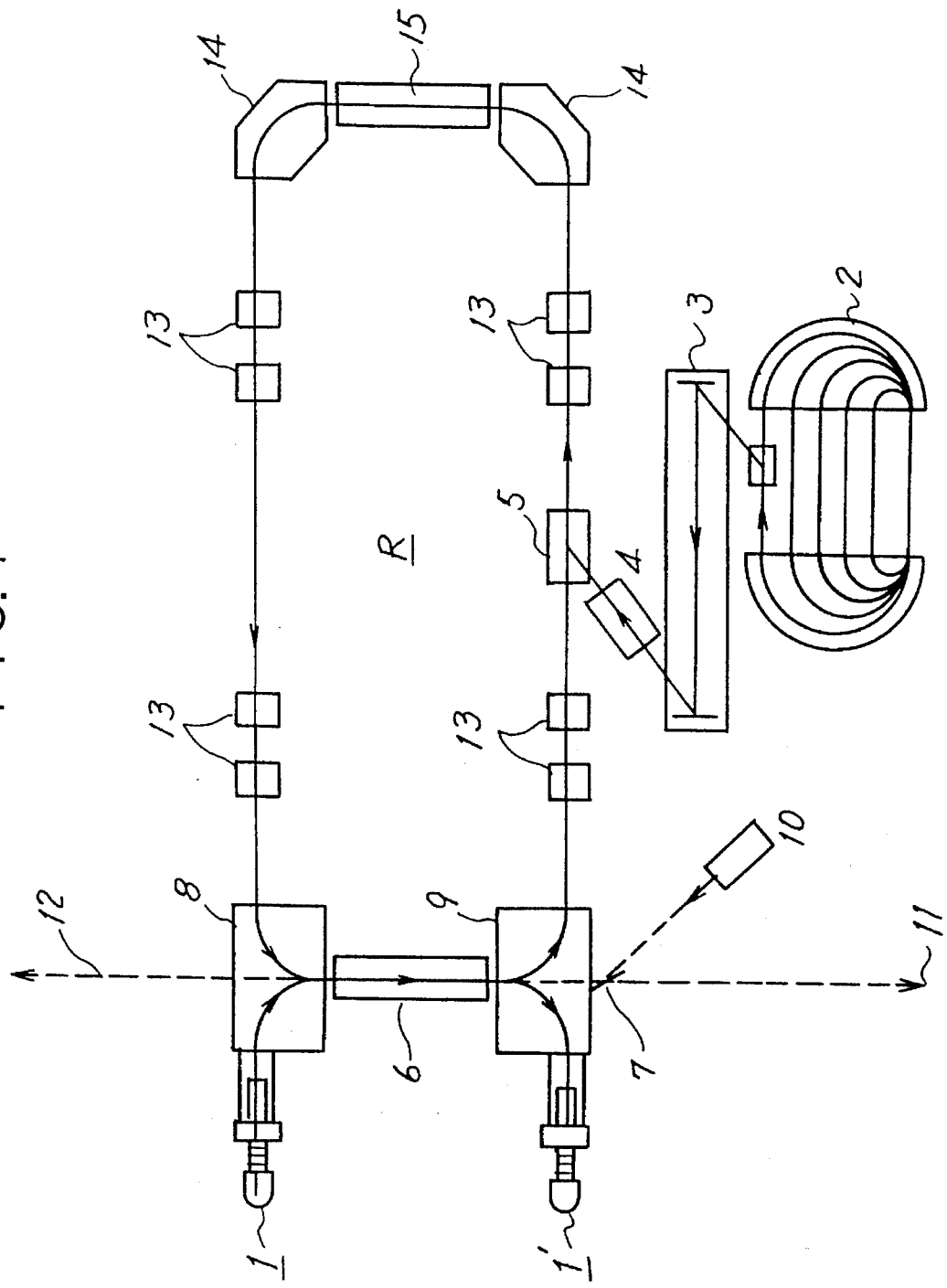
FIG. 1 is a diagram schematically showing a small-size gamma-ray laser generating apparatus illustrating an embodiment of the present invention.

An embodiment of the present invention will now be described with reference to the drawing.

FIG. 1 is a diagram schematically showing a small-size gamma-ray laser generating apparatus illustrating an embodiment of the present invention.

As shown in FIG. 1, the apparatus includes an electron source and accelerating system 1, an electron retarding and collecting system 1', and a small-size accelerator 2 for generating slow positrons. A small-size cyclotron or microtron is suitable in actual practice. The apparatus further includes a thermal positron converter system 3 which consists of the plural tungsten targets generating positrons under the irradiation of high energy electrons, a positron accelerating system 4, an injection magnet 5 for injecting the positron beam into a circulation (cooling) ring R, a beam focusing solenoidal coil 6 for an electron-positron confluence section, a laser photon injection mirror 7 for stimulated formation of positronium molecules and para-positroniums, and joining and dividing magnets 8, 9, respectively. The positrons are cooled by the electron beam while passing through the confluence section.

In case of positrons having an acceleration energy on the order of several hundred keV, as in this embodiment, the positrons are cooled to the same temperature as that of the electron beam, i.e., the momentum is made uniform, in several milliseconds of repeated traversal time. The apparatus further includes a laser beam or maser beam generator 10, an F-GASER 11, a B-GASER 12, a positron beam focusing element 13, a positron beam bending magnet 14 and a solenoid coil 15.

The operation of the gamma-ray laser generating apparatus of the present invention will now be described.

The standard operation of this gamma-ray laser generating apparatus is as set forth in the procedure below.

An electron beam of uniform momentum emitted by the electron source and accelerating system 1 is joined into a confluence with a positron beam by the joining magnet 8, and cools the positrons by Coulomb interaction during their passage through the beam focusing solenoidal coil 6. Thereafter, the electrons leave the confluence section through the dividing magnet 9 and are collected by the electron retarding and collecting system 1'.

Thermal positrons produced by the slow positron generating accelerator 2 and the positron converter system 3 are accelerated by the positron accelerating system 4 to a predetermined energy $\gamma m_o c^2$ equal to that of the electron beam of the electron source and accelerating system 1, and the accelerated thermal positrons are stored in the circulation ring R via the injector magnet 5. The positrons in the circulation ring R are cooled by electrons during passage through the beam focusing solenoidal coil 6 at the confluence section. Here $m_o c^2$ represents the rest-mass energy of the electrons, namely 511 keV, and $\gamma$ is the relativistic energy factor of the electrons, which is expressed by the following formulae:

$$\gamma \equiv (1-\beta^2)^{-\frac{1}{2}} \quad (1)$$

$$\beta \equiv v/c \quad (2)$$

where v, c represent the electron velocity and the velocity of light, respectively.

Some of the electrons and some of the positrons in the confluence section are coupled in such a manner that their respective spins (the quantum mechanical kinetic degree of freedom corresponding to the rotation of the electrons) are anti-parallel to each other, thereby forming two-electron atoms referred to as para-positroniums. The para-positronium undergoes two-photon annihilation at an average lifetime of $1.2 \times 10^{-10}$ seconds and is converted to two gamma rays. However, since the gamma rays are non-coherent and low in intensity, no practical problems arise.

In addition to the para-positroniums, ortho-positroniums in which the spins of the electrons and positrons couple parallel to positroniums in the excited states are also produced in the confluence section. However, since the ortho-positroniums or positroniums in the excited states have a long lifetime, these are dissociated into electrons and positrons by induced electromagnetic pulses when they arrive at the dividing magnet 9 together with the surviving para-positroniums. As a result, the positrons remain in the circulation ring R and, hence, there is no loss. In principle, therefore, the positrons in the ring are cooled by an electron beam of a uniform momentum in repeated confluence sections until they are converted to gamma rays.

If use is made of the effect of irradiating the thermal energy of the electrons and positrons and the coupling energy with stimulating radiation to stimulate the formation of para-positroniums [see H. Ikegami, Phys. Rev. Lett. 60.929 (1988)], the amount of para-positroniums produced can be raised by 1000 to 1,000,000 times. Conversely, the long-lived ortho-positroniums or positroniums in the excited states are dissociated by ionization due to the stimulating radiation. Essentially, therefore, the stimulated formation of para-positroniums is performed selectively. Stimulated formation occurs in a case where the frequency $v_s$ and the frequency width $\Delta v_s$ of the stimulating light projected anti-parallel to the electron beam satisfy the conditions below with respect to $\Delta v$, which is fluctuation of velocity $v_e$ due to thermal motion of the electrons and positrons. It should be noted that in a case where projection is not performed in anti-parallel fashion, $\beta$ becomes $-\beta$.

$$(\alpha/2)^2 m_o c^2 = (1+\beta)\gamma \cdot h v_s \quad (3)$$

$$(m_o/2)(\Delta v)^2 = (1+\beta)\gamma \cdot h \Delta v_s \quad (4)$$

where $\alpha = 1/137$ is the fine structure constant and h is Planck's constant.

Furthermore, when one other type of stimulating radiation in which 0.4 eV is substituted for the left side, namely $(\alpha/2)^2 m_o c^2$ (=6.8 eV), of Equation (3) and $m_o$ is substituted for $m_o/2$ in Equation (4), is projected in a superimposed or combined state, the produced positroniums are coupled two at a time and a positronium molecule is obtained as a high-density cluster.

As will be understood from Equations (3) and (4), electrons and positrons whose thermal energy $(\frac{1}{2})m_o v_e^2$ is almost zero are selected and coupling energy is emitted as photon energy of stimulated radiation, as a result of which the thermal energy of the produced para-positronium falls to $m_o (\Delta v)^2$ and its density rises. Moreover, the all para-positroniums at the instant of stimulated formation by coherent stimulating radiation are microscopically in the same state and a transient Bose-Einstein condensation system is formed. In addition, the positronium molecule itself is a condensed ensemble of para-positroniums.

It is believed that these para-positroniums or positronium molecules can only behave in a completely ordered way in which two-photon annihilation of any positronium atom is correlated with the annihilation of all of the others. In this case, the photons are emitted in the direction of the para-positronium beam and in the opposite direction as well with in a very small solid angle that is proportional to $(\Delta v_s/v_s)$.

By taking the foregoing facts into account, an Einstein coefficient is calculated and a theoretical value of enhancement of annihilation probability by the self-stimulation of the para-positronium can be obtained.

In a case where the number density of positrons in the conventional, simple electron beam generators 1, 1' (having an accelerating energy of 400 keV and a number density of electrons of $10^{15}$ m$^{-3}$) and in the beam focusing solenoid coil for the confluent beam section of the small-size positron circulation ring R is the same as the number of electrons, the density of the produced para-positroniums surpasses the number density of electrons and the enhancement of annihilation probability increases digit by digit owing to the condensation effect. As a result, all of the para-positroniums formed by stimulating radiation generate a gamma-ray laser (GASER) at one time by two-photon annihilation due to the self-stimulation effect in a short period of time of $10^{-12}$ seconds. Meanwhile, the positronium molecules have a lifetime of $10^{-13}$ seconds, irrespective of the the number produced, and undergo self-induced annihilation to generate a gamma-ray laser.

The annihilation time is much shorter than condensation retention time $\Delta t = h/m_o (\Delta v)^2$ ($10^{-10}$ seconds in this embodiment) decided by Heisenberg's Uncertainty Principle, and transient Bose-Einstein condensation of the para-positroniums is maintained within the annihilation time. This supports the fact that the coherence of the para-positronium beam is assured.

One coherent photon group generated by two-photon annihilation due to the self-stimulated emission of positroniums or a para-positronium beam of uniform phase is an F-GASER emitted in the traveling direction of the positroniums, and the photon energy thereof is as follows:

$$hv_{F\text{-}GASER} = (1+\beta)\gamma m_o c^2 \qquad (5)$$

The photon energy of a B-GASER emitted anti-parallel to the traveling direction of the positroniums is as follows:

$$hv_{B\text{-}GASER} = (1-\beta)\gamma m_o c^2 \qquad (6)$$

This is monochromatic light of uniform phase.

In the case of the electron accelerating energy of 400 keV in this embodiment, the photon energies of the two types of GASERs are as follows:

$$hv_{F\text{-}GASER} = 1.67 \ MeV, \ hv_{B\text{-}GASER} = 0.15 \ MeV$$

In both cases the wavelength is shorter than that of the radiation produced by presently existing large-scale radiation rings.

As many apparently widely different embodiments of the present invention can be made without departing from the spirit and scope thereof, it is to be understood that the invention is not limited to the specific embodiments thereof except as defined in the appended claims.

In accordance with the present invention as described above in detail, the following effects can be obtained:

(1) A monochromatic gamma-ray laser, namely a forward GASER, having a photon energy of greater than several MeV and a monochromatic gamma-ray laser, namely a backward GASER, having a photon energy of less than 200 keV can be generated simultaneously and extracted with ease. These GASERs do not exist in the prior art.

(2) If the acceleration energy of electrons and positrons is raised by introducing an electron-beam circulation ring, a monochromatic gamma-ray laser and an F-GASER in the GeV (giga-electron volt) energy region can also be generated.

(3) In particular, in terms of monochromaticity, low noise and reduced size of the apparatus, a gamma-ray laser, an F-GASER and a B-GASER are far superior to those obtained with radiation and a large-size radiation ring. The present invention is capable of contributing to new research and development, in which coherence has been introduced, in the field of chemistry, in fields relating to the properties of structures, in elementary particle physics and in fields in which these are applied.

What is claimed is:

1. A method of generating a gamma-ray laser comprising the steps of:

causing an electron beam and a positron beam accelerated to identical energies to join into a confluence in the same direction; and forming, on the axis of confluence, positronium molecules or beam-shaped para-positroniums of the same phase cooled to transient Bose-Einstein condensation or the vicinity thereof, thereby simultaneously generating gamma-ray lasers of two wavelengths which accompany annihilation caused by self-stimulated radiation.

2. The method according to claim 1, wherein the positron beam is stored to at least a predetermined energy and strength.

3. The method according to claim 1, wherein a polarized of non-polarized laser photon beam is projected upon the confluent electron and positron beams to selectively stimulate formation of positronium molecules or beam-shaped cooled para-positroniums of the same phase, thereby generating a gamma-ray laser.

4. The method according to claim 3, wherein the polarized or non-polarized laser photon beam is projected anti-parallel to the traveling direction of the confluent electron and positron beams.

5. An apparatus for generating a gamma-beam laser, comprising:

an electron and positron injector system;

a positron circulation ring;

a focusing element of an electron-positron confluence section; and means for accelerating an electron beam and a positron beam to respective predetermined energies by said injector system and, if necessary, said circulation ring, and causing the electron beam and the positron beam to join into a confluence in the same direction by said focusing element of the confluence section, thereby generating a high-energy forward gamma-ray laser and a low-energy backward gamma-ray laser in a forward direction and reverse direction, respectively.

6. The apparatus according to claim 5, further comprising a device for projecting laser light or master light upon the confluence electron and positron beams in order to selectively stimulate formation of positronium molecules or beam-shaped cooled para-positroniums of the same phase.

* * * * *